United States Patent
Fargeot

[19]

[11] Patent Number: 5,908,060
[45] Date of Patent: Jun. 1, 1999

[54] TREE PROCESSING MACHINE

[75] Inventor: Raymond Fargeot, Notre Dame de l'Ile Perrot, Canada

[73] Assignee: Prenbec Inc., Hudson Heights, Canada

[21] Appl. No.: 09/014,916

[22] Filed: Jan. 28, 1998

[51] Int. Cl.⁶ .................................................. A01G 23/08
[52] U.S. Cl. ......................... 144/4.1; 144/34.1; 144/336; 144/338; 144/24.13; 285/121.5; 285/121.3
[58] Field of Search ..................................... 144/4.1, 34.1, 144/336, 338, 24.13; 285/121.3, 121.5, 119, 272; 83/928

[56] References Cited

U.S. PATENT DOCUMENTS

| | | |
|---|---|---|
| 2,395,899 | 3/1946 | Morrow et al. . |
| 3,314,562 | 4/1967 | Farmer . |
| 3,683,979 | 8/1972 | Peltola et al. ............................ 144/34.1 |
| 4,098,526 | 7/1978 | DuBois . |
| 4,280,720 | 7/1981 | Lomenech et al. . |
| 4,830,048 | 5/1989 | Walter . |
| 4,892,984 | 1/1990 | Clark et al. . |
| 4,989,652 | 2/1991 | Hansson .................................. 144/336 |
| 5,082,036 | 1/1992 | Vierikko .................................. 144/338 |
| 5,129,438 | 7/1992 | Hamilton ................................. 144/338 |
| 5,186,227 | 2/1993 | Eriksson . |

FOREIGN PATENT DOCUMENTS

| | | |
|---|---|---|
| 1083016 | 8/1980 | Canada . |
| 1318572 | 6/1993 | Canada . |
| 1325159 | 12/1993 | Canada . |

*Primary Examiner*—W. Donald Bray
*Attorney, Agent, or Firm*—Birch, Stewart, Kolasch & Birch, LLP

[57] ABSTRACT

A tree processing machine having a boom, a tree processor head carrying tree processing elements, and a rotator rotatably connecting the tree processing head to the end of the boom. The rotator has a casing, that is non-rotatably mounted from the end of the boom, and a support shaft hat is mounted in the casing for rotation about its longitudinal axis relative to the casing and that supports the processor head at its lower end. Rotating means are provided on the rotator for rotating the support shaft relative to the casing. A first set of hydraulic lines extend from the boom to the casing and a second set of hydraulic lines extend from the support shaft to the processor head. Hydraulic flow paths extend through the rotator between the first and second sets of hydraulic lines.

8 Claims, 3 Drawing Sheets

5,908,060

TREE PROCESSING MACHINE

BACKGROUND OF THE INVENTION

1. Field of the Invention

This invention is directed toward an improved tree processing machine. The invention is also directed toward an improved rotator for use in supporting a tree processor on the tree processing machine.

2. Description of the Prior Art

The tree processing machine of the present invention is of the type employing a tree processor that is suspended from a boom on the machine. Examples of such machines are shown in CP 1,318,572 and U.S. Pat. No. 5,186,227. The tree processor carries a tree processing device in the form of grapple arms which are also used for delimbing, tree feeding, and tree cutting. A rotator connects the tree processor to the end of the boom and is used to rotate the processor, relative to the boom, about a vertical axis. Hydraulic lines extend from the boom to the processor from use in operating the tree processing means on the processor, Electrical lines can also extend from the boom to the processing head for use in controlling the hydraulics associated with the processing device on the processor, The hydraulic and electrical lines must be long enough to allow the processor to rotate without tangling the lines. However the long lines are exposed to damage in the work environment. Furthermore the processor cannot be rotated practically beyond 180° because of the lines.

SUMMARY OF THE INVENTION

It is the purpose of the present invention to provide a tree processing machine that has the hydraulic lines, and the electrical lines, if employed, arranged in a manner that minimizes the chances of damaging the lines in the work environment while still permitting the tree processing head to be supported and rotated by the rotator.

It is a further purpose of the present invention to allow 360° rotation of the processing head relative to the boom In accordance with the present invention, the tree processing machine of the present invention has the hydraulic lines running from the boom directly to the rotator and then from the rotator directly to the processing head. More particularly, a first set of hydraulic lines run directly to the casing of the rotator from the boom, the casing being non-rotatable mounted to the boom. A second set of hydraulic lines run directly from the support shaft of the rotator to the processor head, the support shaft being rotatable in the casing and projecting from the bottom of the casing to non-rotatably support the processor head. The rotator is constructed to allow the flow of hydraulic fluid between the first and second sets of hydraulic lines.

Preferably the rotator is also constructed to have the electrical lines run directly to the rotator from the boom and then from the rotator to the processor. Having the hydraulic and electrical lines run from the boom to the rotator, and from the rotator to the processor head, maintains the lines close to the vertical axis of rotation of the processor thus shortening the lines and making it less likely that the lines will be snagged or otherwise damaged while still permitting the processor to be rotated by the rotator.

The invention is particularly directed toward a tree processing machine having a boom, a tree processor head carrying tree processing elements, and a rotator rotatably connecting the tree processing head to the end of the boom. The rotator has a casing, that is non-rotatably mounted from the end of the boom, and a support shaft that is mounted in the casing for rotation about its longitudinal axis relative to the casing and that supports the processor head at its lower end. Rotating means are provided on the rotator for rotating the support shaft relative to the casing. A first set of hydraulic lines extend from the boom to the casing and a second set of hydraulic lines extend from the support shaft to the processor head. Hydraulic flow paths extend through the rotator between the first and second sets of hydraulic lines.

The invention is also directed toward a rotator for use in a tree processing machine, the rotator having a casing and a support shaft rotatably mounted in the casing for rotation about its longitudinal axis relative to the casing. The casing has pivot means at its top end for use in pivotally connecting the rotator to a boom on a tree processing machine for pivoting about an axis that is transverse to the axis of rotation of the support shaft. The support shaft has pivot means at its lower end for pivotally connecting the rotator to a tree processor for pivoting about an axis that is also transverse to the axis of rotation of the support shaft. Rotating means are provided on the rotator for rotating the support shaft relative to the casing. A first set of hydraulic connectors, extending generally transverse to the longitudinal axis of the support shaft, are provided on the casing. A second set of hydraulic connectors, extending generally parallel to the longitudinal axis of the support shaft, are provided on the support shaft. Hydraulic flow paths extend through the casing and the support shaft between the first and second set of connectors.

The term "tree processing machine" means any type of wood harvesting machine, mobile or stationary, that includes a boom, mounted to a platform, and a processing tool mounted on a swivel, at the end of the boom, for rotation relative to the end of the boom. A "tree processing head" means any operational tool for processing a tree or similar article, such as a feller head, a delimbing attachment, or a feller-delimber, etc.

BRIEF DESCRIPTION OF THE DRAWINGS

The invention will now be described in detail having reference to the accompanying drawings in which.

DESCRIPTION OF THE PREFERRED EMBODIMENTS

Figure 1:
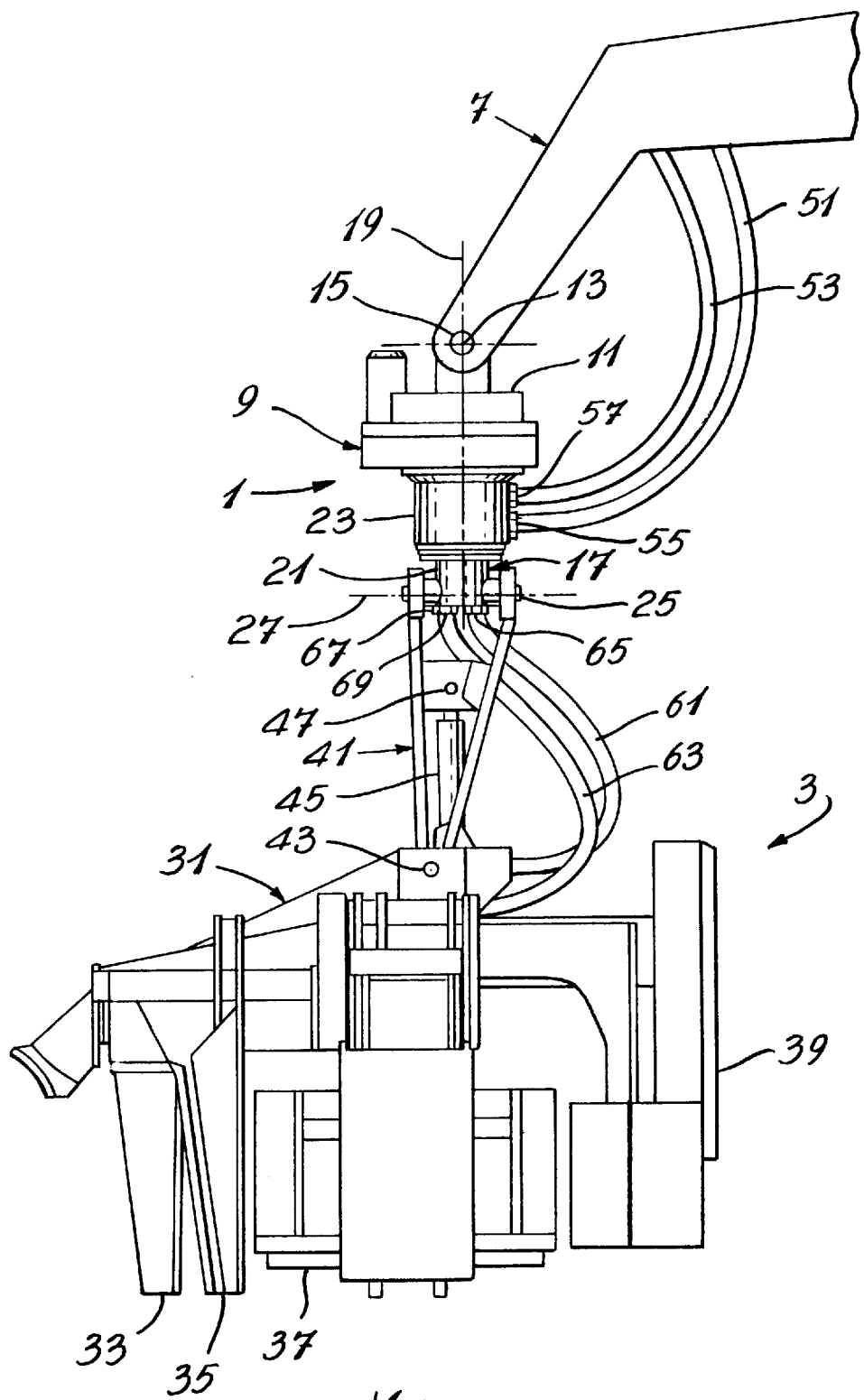
FIG. 1 is a side view of the tree processor suspended from a rotator.

The rotator 1 of the present invention, as shown in FIG. 1, is used to rotatably connect a tree processor head 3 to the free end 5 of a boom 7 that is carried by a tree processing machine (not shown). The rotator 1 has a casing 9 that is pivotally connected at its upper end 11 by pivot means 13 to the free end 5 of the boom 7, for pivoting about a generally horizontal axis 15. The rotator 1 also has a support shaft 17 rotatably mounted in the casing 9 for rotation about its longitudinal axis 19. The lower portion 21 of the support shaft 17 extends out of the bottom end 23 of the casing 9 and carries pivot means 25 for supporting the processor head 3 for pivoting about a generally horizontal axis 27. The horizontal pivot axes 15, 27 are generally transverse to the longitudinal axis 19 of the support shaft 17. Rotation of the support shaft 17 about its longitudinal axis 19 in the casing 9, as will be described, will rotate the processor head 3 about the longitudinal axis 19 as well.

The tree processor head 3 is of known type having a support frame 31 on which, on one side, are mounted various tree processing elements such as grapple arms 33, 35, tree feeding means 37 and tree cutting means 39. The grapple arms 33, 35 are used to both hold a tree and to delimb it. The processor head 3 includes a carrying frame 41, mounted at one end by pivot means 43, to the other side of the support frame 31 opposite the tree feeding means 37. The other end of the carrying frame 41 is mounted onto the rotator 1 by the pivot means 25. An actuator in the form of a hydraulic cylinder 45 is mounted at one end by pivot means 47 to the carrying frame 41 intermediate its ends. The other end of the cylinder 45 is mounted by pivot means (not shown) to the support frame 31 adjacent the pivot means 43. The hydraulic cylinder 45 is mounted within the carrying frame 41 for protection. Operation of the cylinder 45 will rotate the support frame 31 about the pivot means 43 between an upright position where the frame 31 is adjacent the carrying frame 41 and a horizontal position as shown in FIG. 1.

A first set of hydraulic lines 51, 53 extend between the boom 7 and the rotator 1. The hydraulic lines 51, 53 to the boom 7, adjacent the boom's front end, are connected to a hydraulic source (not shown) on the processing machine. The hydraulic lines 51, 53 connect to a first set of hydraulic connectors 55, 57 on the casing 9 of the rotator 1. The connectors 55, 57 extend generally radially to the longitudinal axis 19 of the casing 9. A second set of hydraulic lines 61, 63 extend between the rotator 1 and the processor head 3. The second set of lines 61, 63 are connected to a second set of hydraulic connectors 65, 67 on the support shaft 21 of the rotator 1. The second set of connectors 65, 67 extend axially from the bottom end 69 of the shaft 21. The second set of hydraulic lines 61, 63 connect to the various tree processing elements on the processor head 3. The two sets of hydraulic lines carry hydraulic fluid between the hydraulic fluid source and the tree processing elements on the processor head 3 through the rotator 1 as will be described.

Figure 2:
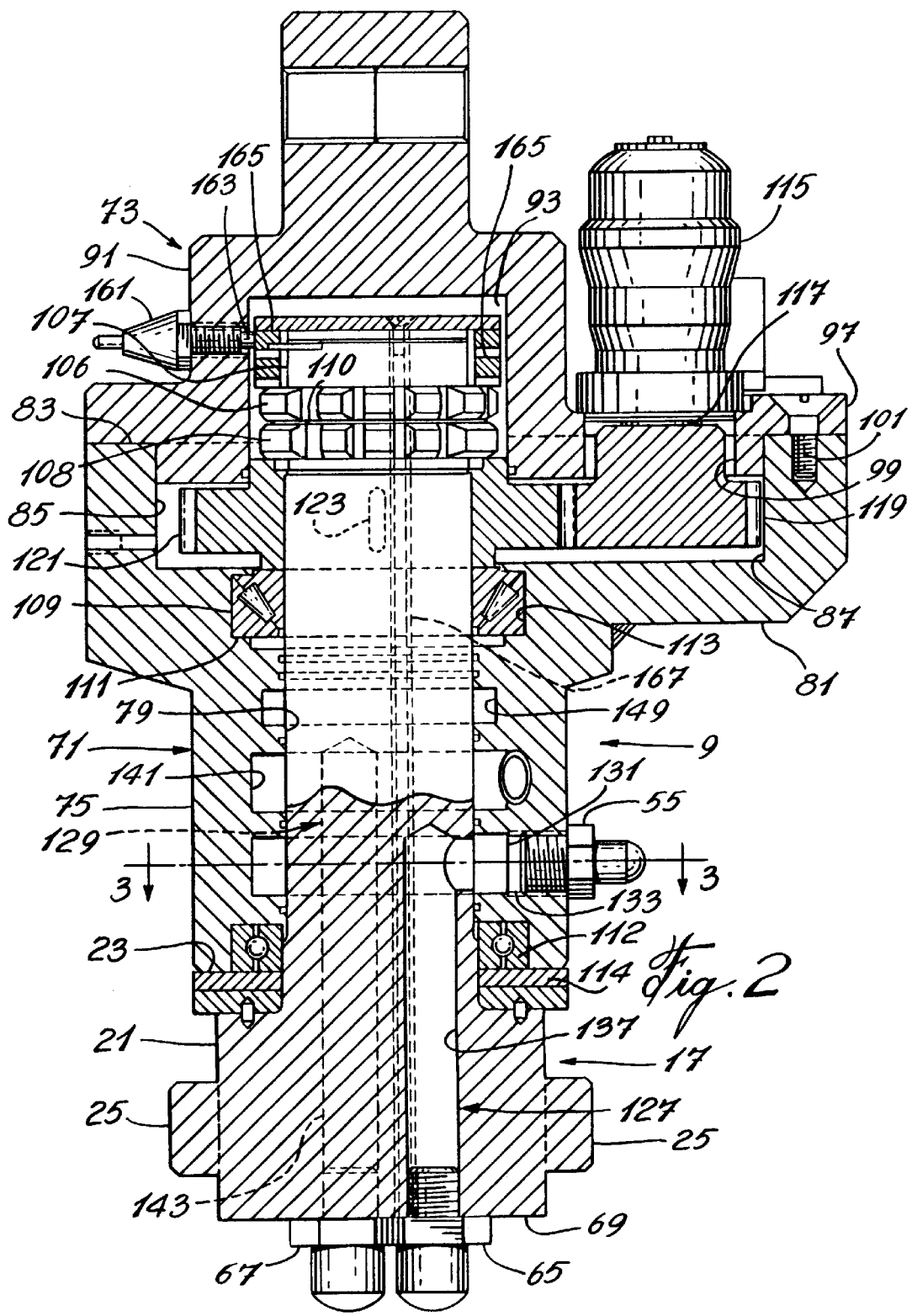
FIG. 2 is a longitudinal cross-section view of the rotator taken along line 2—2 in FIG. 3.
Figure 3:
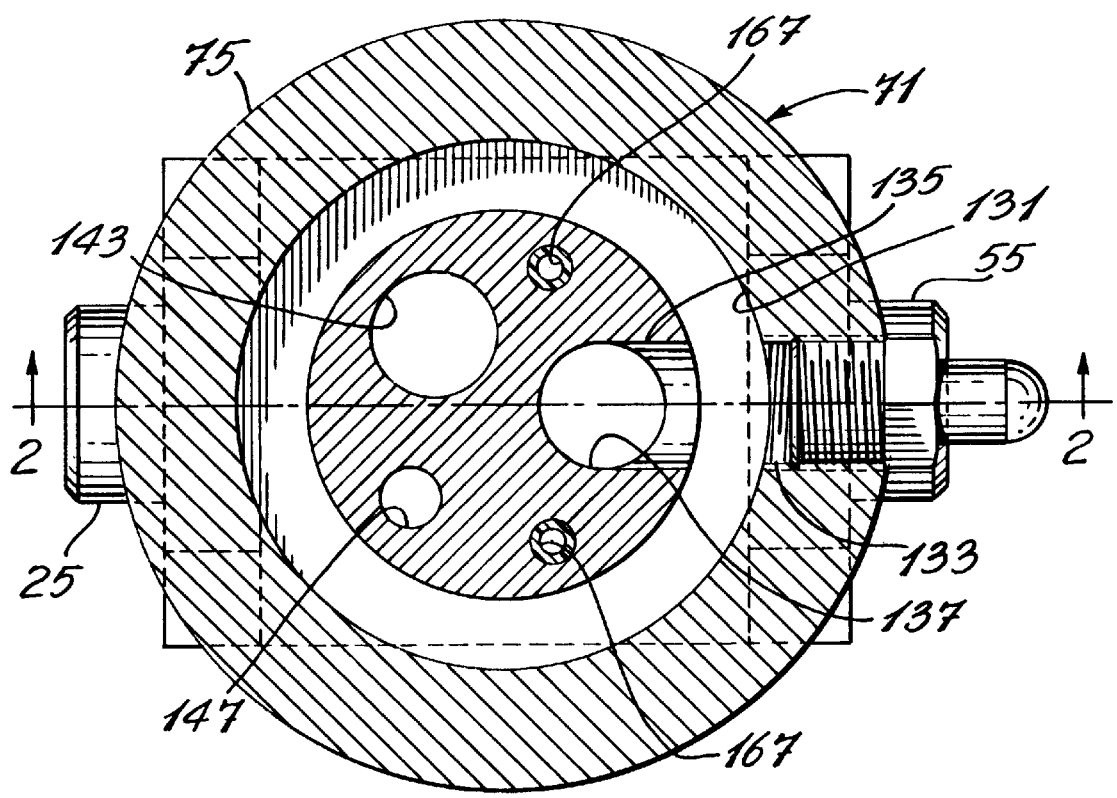
FIG. 3 is a cross-section view taken along line 3—3 of FIG. 2.

The rotator 1, in more detail as shown in FIGS. 2 and 3, has a lower tubular member 71 and an upper cover 73 forming the casing 9. The lower tubular member 71 has a lower cylindrical portion 75 and an enlarged upper cylindrical portion 77. A central bore 79 extends through the cylindrical portions 75, 77. The upper cylindrical portion 77 has a laterally offset section 81. The upper cylindrical portion 77 is counter bored from its top end 83 as shown at 85. The offset section 81 also has a bore 87 extending inwardly from its top end 83, the bore 87 parallel to counter bore 85 and intersecting it, and of the same depth.

The upper cover 73 has a central cylindrical portion 91 aligned with the lower cylindrical portion 75 in the lower tubular member 71. A bore 93 extends upwardly into portion 91 from the bottom end of the cover 73, the bore 93 aligned with the bore 79 in the tubular member 71 when the cover is mounted on the tubular member 71. The cover 73 also has a laterally offset portion 97 with a through hole 99 in it. The cover 73 is adapted to be mounted on the top 83 of the tubular member 71 with suitable fastening means 101 about its periphery.

The support shaft 17 fits snugly within the bore 79 in the casing 9 with its lower, enlarged portion 21 extending below the bottom end 23 of the casing 9. The upper portion 107 of the shaft 17 lies within the bore 93 in the cover 91. SKF nuts 106 and 108, separated by a break crown 110, mount the gear 121 and electrical ring 165 to the upper portion 107 of shaft 17. A thrust bearing 109 mounted on the shaft 17 rests on a shoulder 111 formed by a second counter bore 113 within counter bore 85 to retain the shaft 17 within the casing 9 against the load exerted by the processor head 3 mounted on the lower portion 21 of the shaft by the pivot means 25. The shaft 17 is also supported by the annular bronze thrust plate 114 and bearing 112.

Rotating means are provided on the rotator 1 for rotating the support shaft 17 relative to the casing 9. The rotating means includes a small hydraulic motor 115 mounted on the cover 91 over the through hole 99 in the cover. The shaft 117 from the motor 115 extends down through the hole 99 and carries a drive gear 119 within the bore of the offset section 81 of the upper cylindrical portion 77 of the tubular member 71. The drive gear 119 on the motor 115 meshes with a driven gear 121 mounted on the support shaft 17 and located within the counter bore 85. The driven gear 121 is fixed to the support shaft 17 with a key 123. Operation of the motor 115 will rotate the support shaft 17 relative to the casing 9 through the gears 119, 121 thus rotating the processor head 3 through its connection to the support shaft 17 via pivot means 25.

First and second flow means 127, 129 are provided in the rotator 1 for directing hydraulic fluid through the rotator between the first set of hydraulic connectors 55, 57 in the casing 9 and the second set of hydraulic connectors 65, 67 in the support shaft 17. The first flow means 127 comprises an annular channel 131 formed within the lower cylindrical portion 75 of the tubular member 71, the channel 131 opening up into the bore 79. The annular channel 131 communicates with the hydraulic connector 55 through a radial channel 133 in the tubular member 71. The annular channel 131 also communicates, through a radial channel 135 formed in the support shaft 17, with an axial channel 137 in the support shaft 17 leading to the hydraulic connector 65 at the bottom end 69 of the support shaft 17. The second flow means 129 is similar to the first flow means 127 and comprises an annular channel 141 in the tubular member 71 opening up into the bore 79, a radial channel (not shown) in the tubular member 71 connecting the annular channel 141 to the second hydraulic connector 57, a radial channel (not shown) in the support shaft 17 connecting the annular channel 141 to an axial channel 143 in the support shaft 17 which axial channel 143 connects to the second connector 67 in the second set of connectors. One of the flow means 127, 129 brings hydraulic fluid from the hydraulic source on the tree processing machine to the tree processor 3 through the rotator 1 and the other flow means returns the fluid.

If required, an overflow line for the hydraulic fluid from the processor head can be provided, the overflow fluid brought to a connector (not shown) at the bottom end of the support shaft 17 by a line (not shown) and directed through the support shaft 17 by an axial channel 147 to an annular channel 149 via a radial channel (not shown) and out of the casing 17 through another radial channel (not shown) and back to the boom by another line (not shown) to return to the hydraulic source.

The rotator 1 also includes means for making an electrical connection between the tree processing means and the processor head 3 if required. Electrical lines (not shown) lead from the boom to electrical connectors 161 (one shown) on the cover 73 of the casing 9. The electrical connectors 161 are each connected via a brush 163 (one shown) to a conductive ring 165 mounted on the upper portion of the support shaft 17 within the bore 93 in the cover 73. Each ring 165 is electrically connected to an insulated rod 167 which extends axially through the support shaft 17 to electrical connections (not shown) at the bottom end 69 of the support shaft 17. Electrical lines lead from these bottom electrical connectors to the processor head 3 to allow control of the hydraulics associated with each of the tree processing elements.

I claim:

1. A tree processing machine having: a boom, a tree processor head carrying tree processing elements, a rotator rotatably connecting the tree processing head to the end of the boom, the rotator having a casing, the casing non-rotatably mounted from the end of the boom, and a support shaft that is mounted in the casing for rotation about its longitudinal axis relative to the casing and that supports the processor head at its lower end; means for rotating the support shaft relative to the casing, a first set of hydraulic lines extending from the boom to the casing, a second set of hydraulic lines extending from the support shaft to the processor head, hydraulic flow paths extending through the rotator between the first and second sets of hydraulic lines; a first electrical line extending from the boom to the casing, a second electrical line extending from the support shaft to the tree processor head, and an electrical flow path through the rotator connecting the first and second electrical lines together.

2. A tree processing machine as claimed in claim 1 wherein each hydraulic flow path has an annular channel in the casing, a radial channel in the casing connecting the annular channel to a line in the first set of hydraulic lines, a radial channel in the support shaft connecting the annular channel to a channel extending in the axial direction in the support shaft, the axially extending channel connecting to a line in the second set of hydraulic lines.

3. The tree processing machine as claimed in claim 1, wherein each hydraulic flow path has an annular channel in the casing, a radial channel in the casing connecting the annular channel to a line in the first set of hydraulic lines, a radial channel in the support shaft connecting the annular channel to a channel extending in the axial direction in the support shaft, the axially extending channel connecting to a line in the second set of hydraulic lines.

4. The tree processing machine as claimed in claim 1, wherein each electrical flow path through the rotator comprises an electrical connector on the casing, a conductive ring on the support shaft electrically connected to the connector, and a conductor extending in an axial direction through the support shaft to its bottom end, the conductor electrically connected to the ring and insulated from the support shaft.

5. A rotator for use in a tree processing machine, the rotator having a casing and a support shaft rotatably mounted in the casing for rotation about its longitudinal axis relative to the casing, the casing having pivot means at its top end for use in pivotally connecting the rotator to a boom on a tree processing machine for pivoting about an axis that is transverse to the axis of rotation of the support shaft, the support shaft having a pivot means at its lower end and for pivotally connecting the rotator to a tree processor for pivoting about an axis that is also transverse to the axis of rotation of the support shaft, means on the rotator for rotating the support shaft relative to the casing, a first set of hydraulic connectors on the casing, extending generally transverse to the longitudinal axis of the support shaft on the casing, a second set of hydraulic connectors on the support shaft and extending generally parallel to the longitudinal axis of the support shaft, hydraulic flow paths extending through the casing and the support shaft between the first and second set of connectors, each hydraulic flow path having an annular channel in the casing, a radial channel in the casing connecting the annular channel to a hydraulic connector in the first set of hydraulic connectors, a radial channel in the support shaft connecting the annular channel to a channel extending in the axial direction of the support shaft, the axially extending channel connecting to a hydraulic connector in the second set of hydraulic connectors.

6. The rotator as claimed in claim 5, including a first electrical connector in the casing, a second electrical connector at the bottom end of the support shaft, and electrical flow paths through the rotator connecting the first and second electrical connectors together.

7. A rotator for use in a tree processing machine, the rotator having a casing and a support shaft rotatably mounted in the casing for rotation about its longitudinal axis relative to the casing, the casing having pivot means at its top end for use in pivotally connecting the rotator to a boom on a tree processing machine for pivoting about an axis that is transverse to the axis of rotation of the support shaft, the support shaft having a pivot means at its lower end and for pivotally connecting the rotator to a tree processor for pivoting about an axis that is also transverse to the axis of rotation of the support shaft, means on the rotator for rotating the support shaft relative to the casing, a first set of hydraulic connectors on the casing, extending generally transverse to the longitudinal axis of the support shaft on the casing, a second set of hydraulic connectors on the support shaft and extending generally parallel to the longitudinal axis of the support shaft, hydraulic flow paths extending through the casing and the support shaft between the first and second set of connectors; a first electrical connector in the casing, a second electrical connector at the bottom end of the support shaft, and electrical flow paths through the rotator connecting the first and second electrical connectors together.

8. A rotator as defined in claim 7, wherein each electrical flow path through the rotator comprises a conductive ring on the support shaft electrically connected to said electrical connector and a conductor extending in an axial direction through the support shaft to its bottom end, the conductor electrically connected to the ring and the second electrical connector, and whereby the conductor is insulated from the support shaft.

* * * * *